United States Patent
Mudulodu et al.

(10) Patent No.: US 10,911,419 B2
(45) Date of Patent: Feb. 2, 2021

(54) SYSTEM AND METHOD FOR SECURE COMMUNICATION IN A NETWORK

(71) Applicant: Silicon Laboratories Inc., Austin, TX (US)

(72) Inventors: Sriram Mudulodu, Hyderabad (IN); Venkat Mattela, San Jose, CA (US)

(73) Assignee: Silicon Laboratories Inc., Austin, TX (US)

( * ) Notice: Subject to any disclaimer, the term of this patent is extended or adjusted under 35 U.S.C. 154(b) by 272 days.

(21) Appl. No.: 15/943,542

(22) Filed: Apr. 2, 2018

(65) Prior Publication Data

US 2019/0306135 A1 Oct. 3, 2019

(51) Int. Cl.
*H04L 29/06* (2006.01)
*H04L 12/801* (2013.01)
*H04L 12/733* (2013.01)
*H04L 12/46* (2006.01)

(52) U.S. Cl.
CPC .......... *H04L 63/0464* (2013.01); *H04L 45/20* (2013.01); *H04L 47/34* (2013.01); *H04L 63/0485* (2013.01); *H04L 63/1466* (2013.01); *H04L 69/163* (2013.01); *H04L 12/4641* (2013.01); *H04L 69/22* (2013.01)

(58) Field of Classification Search
CPC ............... H04L 63/0464; H04L 69/163; H04L 63/0485; H04L 47/34; H04L 45/20; H04L 63/1466; H04L 12/4641; H04L 69/22; H04L 63/1475; H04L 63/0442; H04L 63/18; H04L 63/0435; H04L 12/4625; H04L 45/24
See application file for complete search history.

(56) References Cited

U.S. PATENT DOCUMENTS

| 8,023,648 | B2* | 9/2011 | Seppanen | ............. H04L 9/0637 380/37 |
| 2009/0060198 | A1* | 3/2009 | Little | ....................... H04L 9/34 380/278 |
| 2012/0089829 | A1* | 4/2012 | Kholidy | ................... H04L 9/065 713/153 |
| 2015/0229584 | A1* | 8/2015 | Okamoto | ............ H04L 12/5692 709/226 |
| 2017/0093811 | A1* | 3/2017 | Dolev | ................. H04L 63/0428 |

OTHER PUBLICATIONS

Lou et al., "A Multipath Routing Approach for Secure Data Delivery", 2001, IEEE, pp. 1467-1473. (Year: 2001).*
Lou et al., "Spread: Improving Network Security by Multipath Routing", 2003, IEEE, pp. 808-813. (Year: 2003).*

* cited by examiner

*Primary Examiner* — Matthew Smithers
(74) *Attorney, Agent, or Firm* — File-EE-Patents.com; Jay A. Chesavage

(57) ABSTRACT

An apparatus and method for encrypting messages from a first node splits the message into a plurality of message units, each of which is encrypted. The encrypted message units are split into path units, each of which is directed to a different route path to a destination node. At the destination node, the path units are received and reassembled into encrypted message units, which are decrypted into message fragments and concatenated to form a message corresponding to the original one sent.

35 Claims, 4 Drawing Sheets

Path Decryption

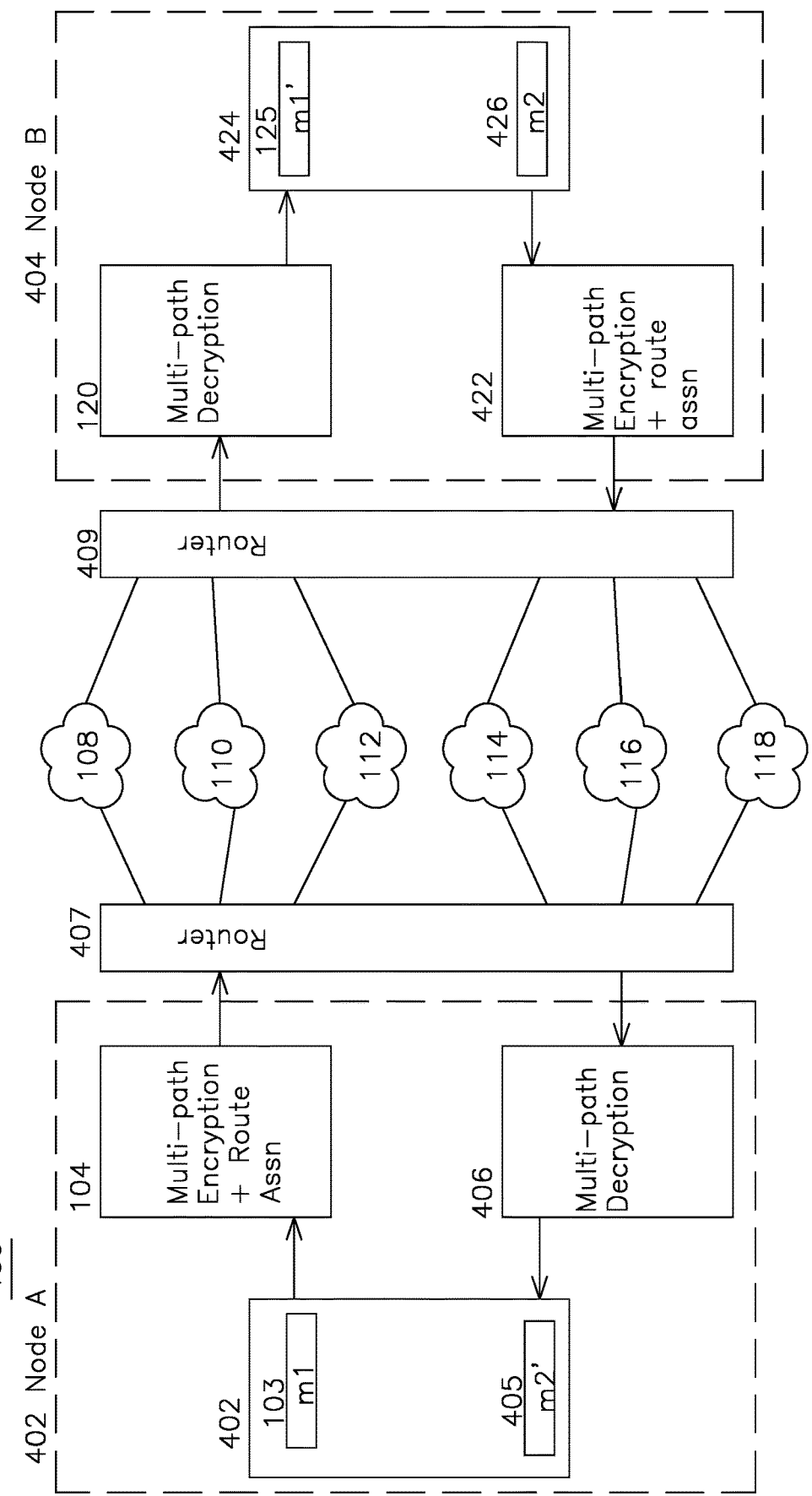

SYSTEM AND METHOD FOR SECURE COMMUNICATION IN A NETWORK

FIELD OF THE INVENTION

The present invention relates to a method and an apparatus for secure communication between two nodes. In particular, the invention relates to splitting encrypted packets into separate paths or connections to increase the difficulty of interception by a man-in-the-middle attack.

BACKGROUND OF THE INVENTION

In internet communications, data is kept secure by encryption of data from a source node to a destination node which may be intermediate stations or hosts, or preferably between end stations or hosts. One example prior art system for end to end encryption is secure http (https) using any of several cyphers, such as any of the family of Advanced Encryption Standard (AES) finalists or other prior art cyphers such as triple DES (now deprecated). Another example prior art system for secure communications is a secure shell (ssh) tunnel, which is commonly used for "virtual private network" (VPN) communications and negotiates the use of the encryption methods for communication during connection setup. A difficulty of these methods is that the communication typically takes place over a single TCP connection, such that any station in the TCP connection path may receive the encrypted data stream and attempt to decrypt it to gain access to the underlying message.

It is desired to provide an apparatus and method for secure end-to-end communication which is not prone to man-in-the-middle decryption attempts.

OBJECTS OF THE INVENTION

A first object of the invention is an apparatus for data encryption which receives a message, breaks the message into message fragments, encrypts each message fragment into an encrypted unit, and breaks each encrypted unit into a plurality of path units, each path unit being assigned a path for transmission to a remote station.

A second object of the invention is an apparatus for data decryption which receives a plurality of path units received from a plurality of paths, the apparatus reassembling the path units into encrypted units, thereafter decrypting the encrypted units into message fragments, thereafter assembling the message fragments into a message.

SUMMARY OF THE INVENTION

A message for transmission is split into a plurality of message units, which are encrypted into encrypted units. The encrypted units are split into a plurality of path units, each path unit having sequence information pre-pended or appended to enable the later reassembly of the packet units into encrypted units for subsequent decryption and reassembly into a message. Each path unit is preferably directed to a unique route path or to a separate connection path (on a unique or shared route path) so that a listening station on any particular route path is not able to receive a complete message to decrypt.

A plurality of message units is received, each message unit having an associated message unit sequence number. The message units from each path are formed into encryption units, which are decrypted into message units, and the message units are concatenated into a message.

According to one aspect of the invention, there is provided a method for encryption of a message, the method comprising: splitting the message into a plurality of message units; encrypting the plurality of message units into a plurality of encryption units; splitting each said encryption unit into a plurality of path units; and directing said plurality of path units to a plurality of route paths.

According to another aspect of the invention, there is provided a method for decryption of a message, the method operative for receiving a plurality of path units from a plurality of route paths, the method comprising: concatenating the plurality of path units into a plurality of encrypted units, each path unit containing at least a path unit sequence number identifying the association of related path units to an encrypted unit; decrypting the plurality of encrypted units into the plurality of message units; concatenating the plurality of message units into a message.

According to another aspect of the invention, there is provided an apparatus for encryption of a message, the apparatus comprising: a message unit generator forming message units by splitting the message into a plurality of message units; an encryption unit generator encrypting the plurality of message units into a plurality of encryption units; a path unit generator splitting the encryption units into a plurality of path units; a path unit scrambler directing the plurality of path units to a plurality of route paths.

According to another aspect of the invention, there is provided an apparatus for decryption of a message, the apparatus configured to receive a plurality of path units over a plurality of route paths, each path unit accompanied by a sequence number, the apparatus comprising: a path unit descrambler forming encrypted units from said path units using said accompanying sequence number; a message unit generator forming message units by decrypting encrypted units from the path unit descrambler; a message generator forming a message by concatenation of message units.

According to another aspect of the invention, there is provided a method for sending a message from a sender node through a plurality of paths to a recipient node, the method comprising: forming a plurality of sender message units from fragments of said sender message; encrypting the sender message units into a plurality of sender encrypted units; fragmenting the sender encrypted units into a plurality of sender path units, the sender path units each having an associated sequence number; transmitting the sender path units over a plurality of paths to a remote recipient node; the recipient node receiving the sender path units over a plurality of paths; the recipient node forming the sender path units into recipient encrypted units using said sender path unit sequence number; said encrypted units decrypted into recipient message units (message fragments); said recipient node concatenating said recipient message units into a recipient message.

BRIEF DESCRIPTION OF THE DRAWINGS

FIG. 4 shows a bidirectional multi-path message encryption/decryption system.

DETAILED DESCRIPTION OF THE INVENTION

Figure 1:
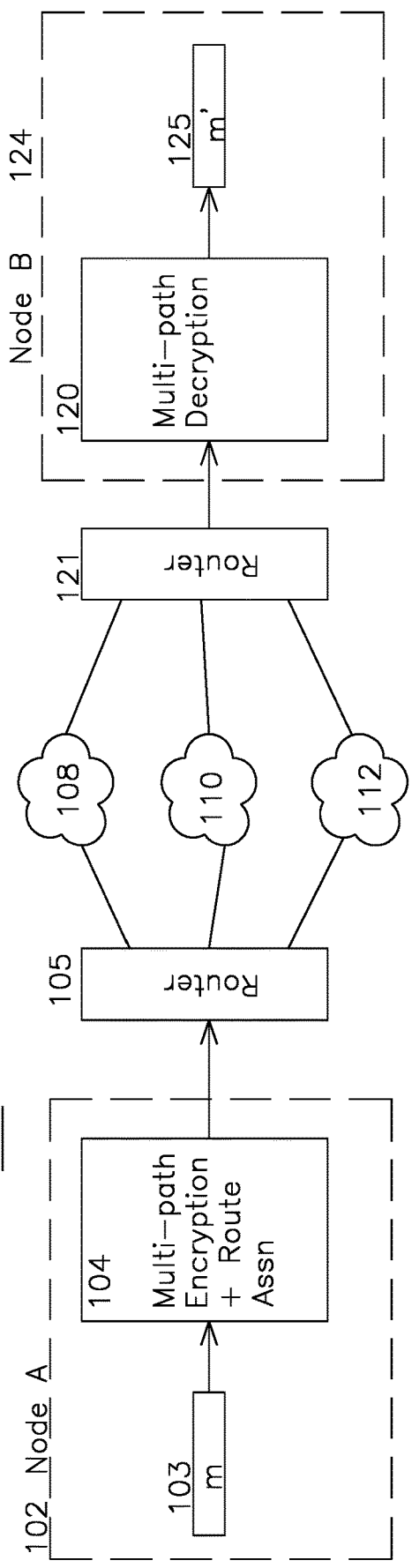
FIG. 1 shows a block diagram for a unidirectional multi-path message encryption and decryption system.

FIG. 1 shows a block diagram for multi-path message encryption and decryption. The message m 103 may be any form of communication, including voice or data, a continuous stream of data, or a fixed length message. In the example of FIG. 1, node A 102 may be any of a host, an application, a station, or other device capable of communication, which has a message m 103, which it wishes to send to node B 124 which may similarly be any of a host, application, station or other device capable of communication. The message m 103 is delivered to multi-path encryption generator 104, which also performs either a route or next node assignment for each of the path units generated by multi-path encryption generator 104 to a particular path, such as a series of route paths or connection paths for use by router or gateway 105, which results in different paths 108, 110, and 112 through the internet, the paths all terminating into router 121, which delivers the streams of packets to multi-path decryption 120. Although the examples shown are for three paths, this number is arbitrary, and is preferably two or more paths, although the invention may also be practiced with a single path using a separate TCP connection for each path. In the present invention, a "path" is understood to be any of: a routed connection with no common intermediate hosts; a routed connection with one or more common intermediate hosts; a gateway connection through one or more intermediate hosts, or a TCP connection distinct from any other route path TCP connection.

On the receiving node B 124, router or gateway 121 terminates the connections associated with each of the separate paths, and delivers the path streams (comprising a plurality of discrete "path units") to multi-path decryption 120, which reassembles the path units into encrypted message units, decrypts those into message units, and concatenates the message units to form message m' 125 in node B 124. Received message m' 125 will match sent message m 103 when the aspects of the present invention are followed.

According to the Open System Interconnect (OSI) standard model which delineates between physical layer 1, link layer 2, network layer 3, transport layer 4, session layer 5, presentation layer 6, and application layer 7, the communication from Node A to Node B may involve various network protocols from Router 105 to Router 121 and intermediate hosts and nodes not shown. Accordingly, other protocols may be operative at other layers between the nodes.

In various embodiments, the communication may be only from Node A to Node B at a given time. An example may be a short message or email sent from Node A to Node B.

Figure 2:
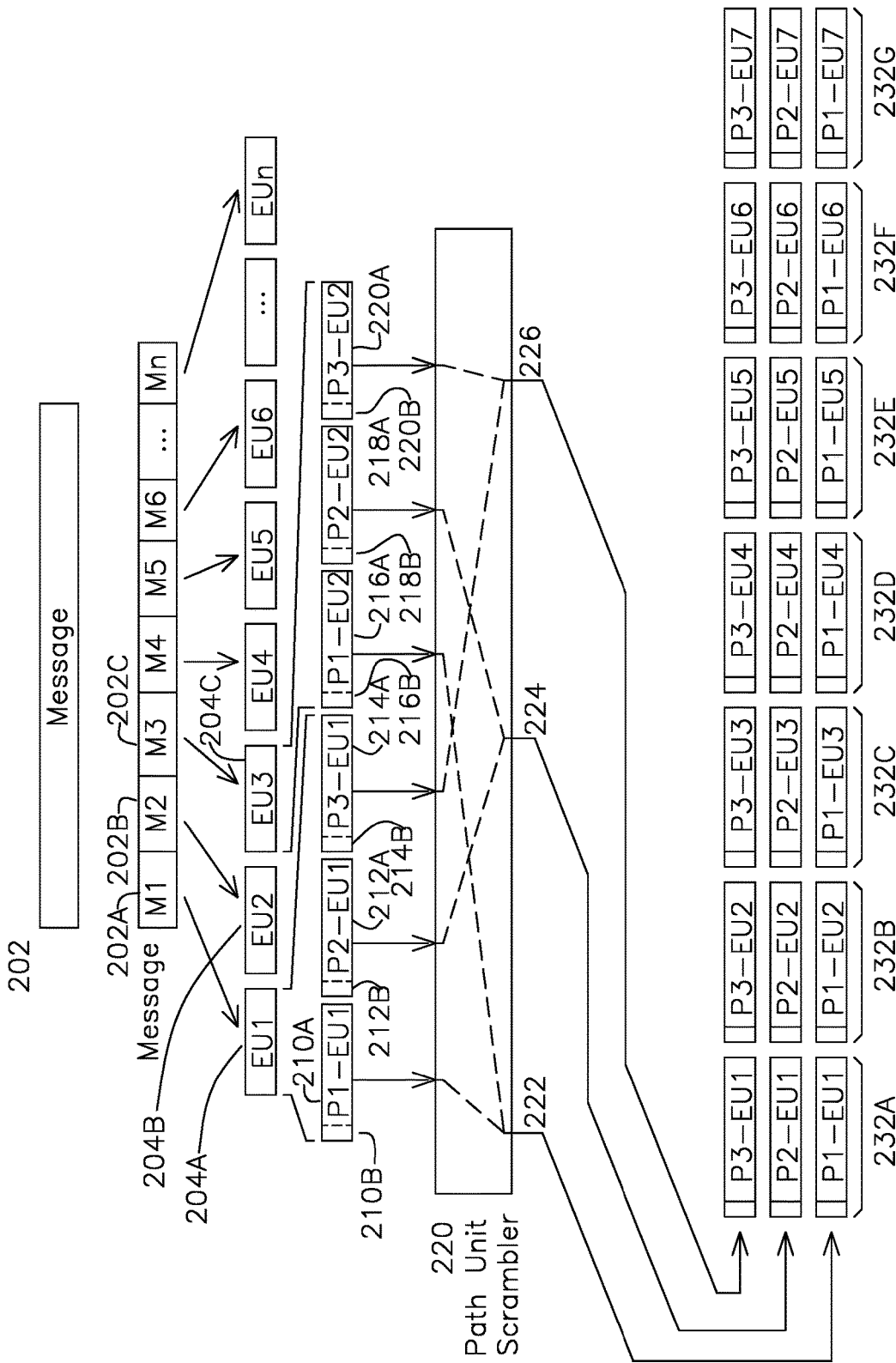
FIG. 2 shows a block diagram for source encryption of a message into a plurality of paths.

FIG. 2 shows a first example of source encryption performed by encryption generator 104 of FIG. 1. Message 202 is first divided into message units M1 202A, M2 202B, M3 202C, and so forth. Each message unit 202A, 202B, 202C . . . is next encrypted into a corresponding encrypted unit 204A, 204B, 204C, etc. Each encrypted unit 204A, 204B, 204C, etc. is next fragmented into corresponding path units 210A, 212A, 214A, 216A, 218A, 220A. Each path unit has a corresponding short header 210B, 212B, 214B, 216B, 218B, 220 prepended (or appended) which contains the sequence number for the particular path unit, the sequence number providing information as to the reassembly of the path units back into encryption units at the receiving node, the sequence number being at least one of: a sequential integer or a pseudo-random sequence also known to the receiving end. Additionally, the sequence number of the path units may be reset periodically upon reaching a threshold. The header may also contain an additional binary bit which is set to 1 only if the path unit is the first path unit of the set forming an encryption unit to ease reassembly of the encryption unit.

As shown in FIG. 2, each path unit (210A, 212A, 214A, 216A, 218A, 220A) is accompanied by an associated header (210B, 212B, 214B, 216B, 218B, 220). In one variation of the invention, the header includes at least one of: a first bit, a second bit, a time to live field, a path unit sequence number field, a hop index field, and a path index field. The first bit may designate a first path unit corresponding to an associated encryption unit. The second bit may indicate whether the path unit is a dummy unit, which is ignored by the receiving node. The first bit and/or the second bit may be encrypted into a larger padded field value. In one example of the invention using routers which examine payload fields of the layer 3 packet, the time to live field of the path unit header is updated for each router hop having the capability to update this field and re-computing the layer 3 payload CRC at each update. The path unit sequence number field may be incremented or otherwise change value in a manner known to the receiver, which optionally uses the sequence number field to reassemble path units into encryption units at the receiving node. In another example of the invention, certain values from the path unit header may be copied into the IP header by a first router receiving the packet. For example, the well-known IPv4 or IPv6 header fields "next hop" (a value indicating a next destination address of a route path), a "time to live" (a value that is decremented for each router hop to prevent circular route packet storms) may be set by the first router accepting the packet. The path index field may indicate a particular path of a list of available paths. The header optionally has a field indicating the number of available route paths such as 222, 224, and 226 of FIG. 2.

Encryption and decryption may be symmetric-key (both sides encrypting using the same private key) or asymmetric-key (each side using a different encryption key). Examples of symmetric-key encryption include Advanced Encryption Standard (AES) finalists MARS (an IBM block cypher), RC6 (a symmetric key block cypher), Rijndael (a symmetric key block cypher from the National Institute of Standards NIST), its subset AES also from NIST, Serpent (a substitution-permutation cypher), and Twofish (a symmetric key block cypher). Many other cyphers are available for use with the present method, this list is only of the current AES finalists. The encryption method used may be a block cypher, a stream cypher, a symmetric key cypher or an asymmetric key cypher.

A path unit scrambler 220 receives each of the path units and directs each to an associated routing path stream. In the illustration of FIG. 2, a round-robin allocation is performed (assignment such as path units canonically assigned to paths 1,2,3,1,2,3 etc. of 222, 224, and 226, respectively, however the path assignments may be done in any manner which provides reassembly in correct order at the remote end. For round robin assignments, the packet order for each path is shown at the path outputs 222, 224, and 226. Each path 222, 224, and 226 now contains a stream of encrypted fragments which is incomplete and therefore cannot be reassembled into the encrypted units to decrypt without knowing the reassembly order or having all of the path units from all paths, in addition to needing to know the reassembly order of the path units and encryption method. The arrangement of path units by path unit scrambler 220 can follow any arrangement which provides for reassembly of the path units into encrypted units at Node B. For example, the path units of the entire message can be collected, scrambled and sent in random order and through randomly assigned paths for reassembly into encrypted units at the receiving node. The path unit scrambler 220 is configured to direct the plurality of path units to a plurality of route paths using a routing method in a network.

In one alternative embodiment, a routing method may be used to direct the plurality of path units to a plurality of route paths in a network. The routing method for directing the path unit to a next node may be based on an entry in a routing table of the gateway router for a destination node in the network. The routing method comprising: if the hop index is greater than a hop index threshold and/or the time to live is less than a time to live threshold, then determining the next node is based on a first entry in the routing table; if the hop index is less than the hop index threshold and/or the time to live is greater than the time to live threshold then determining the next node is based on an entry in the routing table, wherein determining the entry in the routing table comprising: identifying one or more entries corresponding to the destination node in the routing table;

determining the entry from the one or more entries corresponding to the destination node in the routing table: for each odd hop index is computed by an equation: the entry=(number of paths per node)−(path unit sequence number) mod (number of route paths); determining the entry from the one or more entries corresponding to the destination node in the routing table for each even hop index is computed by an equation: the entry=(path unit sequence number)mod(number of route paths).

One of the central objectives of the use of multiple route paths is to increase entropy (disorder) of the message being sent through the use of multiple routes. Accordingly, it is desired to increase the diversity and number of routes. In another alternative embodiment of the invention, the router 105 may utilize a plurality of Virtual Private Networks (VPNs) for forming "super paths", where each VPN superpath may utilize separate TCP connections or encrypted secure shell (SSH) connections to form separate paths within each VPN. Alternatively, the router 105 may utilize a plurality of network connections, each with a separate IP address. In this manner, the router can artificially advertise varying channel capacities for each network address, or alternatively use a single IP address but open separate TCP connections for each route path optionally over one or more VPNs. Where the network access to router 105 is from an internet service provider offering a single IP address, it may be preferable to utilize a plurality of VPN to the target router 121, each VPN using a plurality of TCP connections, such that n VPNs each supporting m TCP connections yields an m*n increase in complexity for an eavesdropper attempting "man in the middle" reception of the transmitted information.

Figure 3:
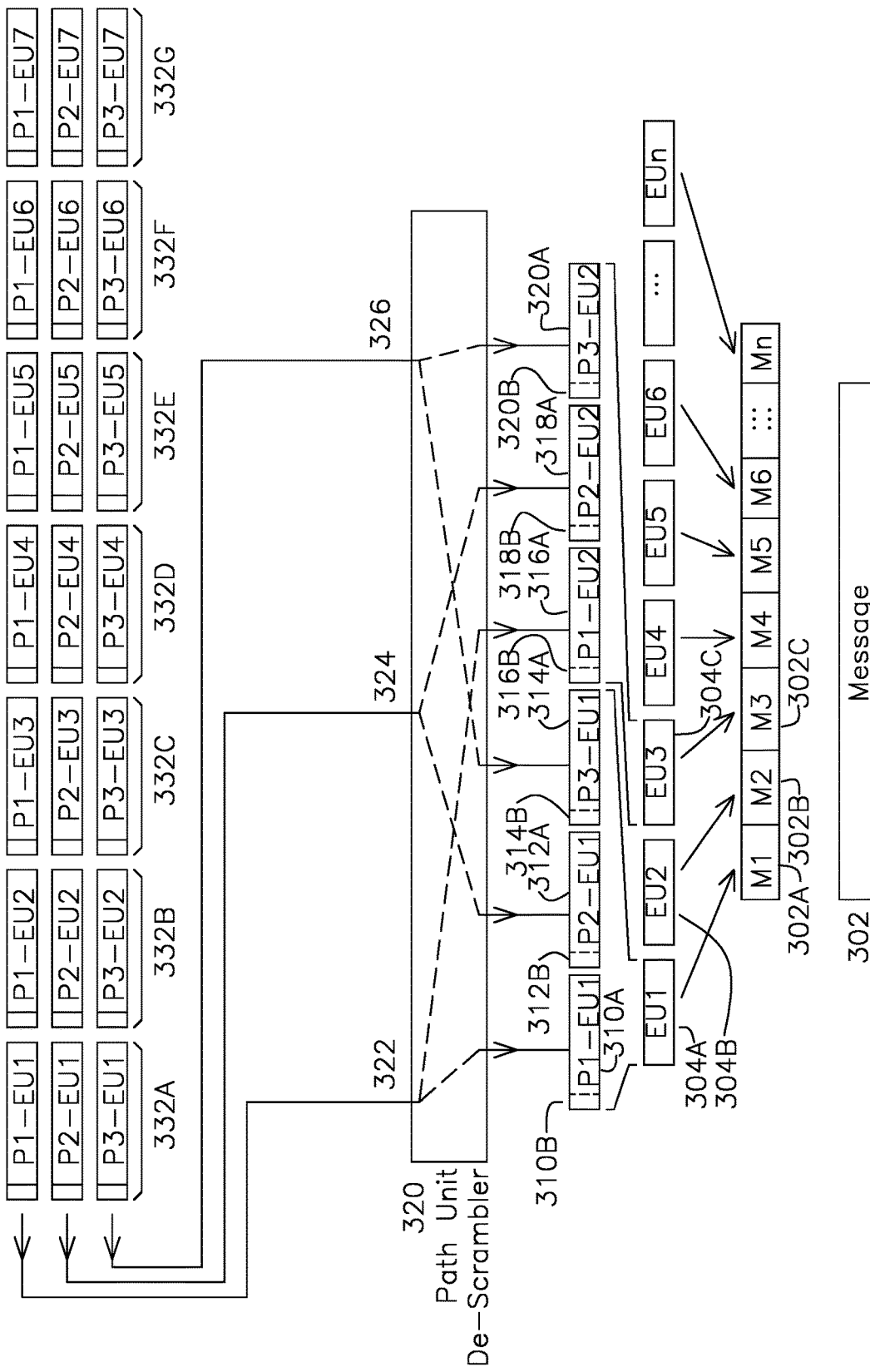
FIG. 3 shows a block diagram for decryption of path units received over a plurality of paths into a message.

FIG. 3 shows an example decryption performed by 120 of FIG. 1 which provides decrypted data to destination nodes 124. Packet units 332A, 332B, etc. are received on different paths by a router such as 121 of FIG. 1, and are directed to multi-path decryption 120 shown in detail FIG. 3. Each stream of packets 322, 324, 326 is first directed to descrambler 320, which uses the same scrambling algorithm used by scrambler 220 of FIG. 2, thereby re-constituting the path units 310A, 312A, 314A, 316A, 318A, 320A, etc. into encrypted units 304A, 304B, 304C, etc. Optionally, the sequence numbers such as 310B, 312B, 314B of each path unit is used to concatenate the associated path units 310A, 312A, 314A into encryption unit 304A. The encrypted units 304A, 304B, etc. are subsequently decrypted into message fragments M1 302A, M2 302B, M3 302C, M4 302D, etc. to form message m' 302. In an example embodiment, the message units 302A, 203B, 302C carry a header which is removed during concatenation into message 302, the header may include a message sequence number which can further aid in forming the message 302.

In a first variation of the invention, each of the path units 310A, 312A, 314A; and 316A, 318A, 320A carries an associated path unit sequence number 310B, 312B, 314B, and 316B, 318B, 320B (corresponding to the sequence numbers 210B, 212B, etc. which were prepended or appended as in FIG. 2). When each path unit has a sequence number associated, any path assignment may be used without regard to any descrambling 320, as the reassembly of packets only requires the sequence number field 310B, 312B, etc., and it does not matter in what order or scrambling the path units are received. The path unit may include an encrypted header as well as an unencrypted header.

In another variation of the invention, the path units are prepended or appended with a sequence number in the form of a path number in the range 1 to n for n routing paths.

In another variation of the invention, no sequence numbers such as 310A, 310B etc. are present (and none were prepended during encryption 210A, 210B, etc.), and the sequence of reassembly is provided as a pseudo-random sequence mod the number of paths n (where mod is the modulo function returning an integer remainder from dividing by n), or a linear round robin, or any method which balances the throughput across the various routes so as to minimize latency from one path to another to aid in reassembly and to reduce the queue memory size of the reassembly buffer.

In another variation of the invention, the sequence numbers are encrypted into the associated EU1 204A, EU2 204B, etc., and the path units carry a path or sequence identifier, the sequence numbers later extracted during decryption and the message reassembled using the decrypted sequence numbers.

According to the aspects of the invention, the sequence number used for reassembly may therefore be associated with at least one of: each message unit M1 202A, M2 202B, M3 202C; each encrypted unit 204A, 204B, 204C as an encrypted sequence number (inside the encrypted part of the packet) or unencrypted sequence number (as a plaintext header to the encrypted packet); the path unit 210A, or not present at all, with the reassembly relying on an a-priori scrambling and descrambling pattern known to both encoder 104/122 and decoder 106/120.

Accordingly, the path unit de-scrambler 320 may reassemble the packet into the original message using a sequence number which is present in at least one of: the path unit 310A, 312A, 314A; the encrypted unit 304A, 304B, etc.; or message unit 302A, 302B, etc.; or by relying on an a-priori scrambling and descrambling pattern known to both encoder 104/122 and decoder 106/120.

FIG. 4 shows an example embodiment for a bidirectional encryption/decryption system 400 similar to the unidirectional example of FIG. 1, where node A 402 communicates with node B 404 using previously described encryption 104 through router/gateway 407 and associated paths to router/gateway 409 coupled through a variety of paths 108, 110, 112, 113, 116, 116 such that message m1 103 is separated into message units, encrypted into encrypted units and then separated into path units which are send through a variety of paths such as route paths or connection paths, decrypted 120 as described previously and reassembled into message 125. As was described for FIG. 1, message m1 103 is securely transmitted from host A 402 to host B 404 as message m1' 125. In the opposite direction from node B 404 to node A 402, message m2 426 is likewise encrypted 422 with an arbitrarily different or variation of the encryption method of 104, sent as path units through a variety of different paths from router/gateway 409 to router/gateway 407, to decryption 406, and reassembled as message m2' 405.

In another variation of the invention, the network path between nodes is a wired link or wireless ink. When the link between two nodes is a wireless link, the length of the path units may be reduced in direct proportion to the range and/or interference on the link is high. Correspondingly, the size of the encryption unit (or message unit) is also reduced to keep the ration of the number of path units to the number of encryption units approximately the same value.

In another variation of the invention, when the bandwidth capacity of the link between two nodes is high, multiple path units may be grouped and transmitted together after encapsulation into a physical packet as determined by the particular link layer protocol (WLAN vs. wired Ethernet, vs. Bluetooth, Zigbee, or other link type). In such embodiments, the path units of the same path are grouped together according to the link type.

The scope of the invention is not limited to the particular examples provided for understanding the invention, and are understood to be as set forth in the claims which follow. A range which is "on the order of" a nominal value is the range from 0.1 times the nominal value to 10 times the nominal value. A range which is "approximately" a nominal value is the range from one half of the nominal value to two times the nominal value.

We claim:

1. A method for encryption of a message, the method comprising:
    splitting the message into a plurality of message units;
    encrypting the plurality of message units into a plurality of encryption units;
    splitting each of the encryption units into a plurality of path units comprising a header and data; and
    directing said plurality of path units to a plurality of route paths;
    wherein the header includes at least one of:
    a first bit indicating a first path unit corresponding to the encryption unit;
    a second bit indicating whether the path unit is a dummy unit indicating the associated path unit is to be ignored by the receiver;
    the first bit and/or the second bit being encrypted;
    a time to live field containing a time to live value;
    a path unit sequence number field indicating a path unit sequence number;
    a hop index field containing a hop index; and
    a path index field containing a path index.

2. The method of claim 1, wherein the header has a field indicating the number of route paths to be used.

3. The method of claim 1 where each of said route paths is a separate network connection.

4. The method of claim 3 where said separate connection is at least one of: a separate TCP connection, a separate VPN connection, or a separate TCP connection in a VPN connection.

5. The method of claim 1 where at least one of: said message unit, said encryption unit, or said path unit contains a sequence number.

6. The method of claim 5 where said sequence number is either an integer or a pseudo-random sequence.

7. The method of claim 1 where said encryption units are encrypted according to at least one of: a block cypher, a stream cypher, a cypher operative with a symmetric key or a cypher operative with an asymmetric key.

8. A method for encryption of a message, the method comprising:
    splitting the message into a plurality of message units;
    encrypting the plurality of message units into a plurality of encryption units;
    splitting each of the encryption units into a plurality of path units comprising a header and data;
    directing said plurality of path units to a plurality of route paths;
    wherein the header includes at least one of:
    a first bit indicating a first path unit corresponding to the encryption unit;
    a second bit indicating whether the path unit is a dummy unit indicating the associated path unit is to be ignored by the receiver;
    the first bit and/or the second bit being encrypted;
    a time to live field containing a time to live value;
    a path unit sequence number field indicating a path unit sequence number;
    a hop index field containing a hop index; and
    a path index field containing a path index;
    wherein the time to live value is updated.

9. A method for decryption of a message, the method operative for receiving a plurality of path units from a plurality of route paths, each path unit comprising a header and data, the method comprising:
    examining a first header bit indicating a first path unit and a second bit indicating whether the path unit is a dummy unit;
    discarding the path unit when the second bit indicates the path unit is a dummy unit;
    concatenating a remaining plurality of path units which are not dummy units into a plurality of encrypted units, each path unit containing at least a path unit sequence number identifying the association of related path units to an encrypted unit;
    decrypting the plurality of encrypted units into the plurality of message units;
    concatenating the plurality of message units into a message.

10. The method of claim 9 where at least one of said route paths is a separate network connection.

11. The method of claim 9 where at least one said route paths is a separate TCP connection.

12. The method of claim 9 where at least one of: said message units, said encryption units, or said path units contains a sequence number for concatenating said message units into said message.

13. The method of claim 9 where said sequence number is either an integer or a pseudo-random sequence.

14. The method of claim 9 where said encryption units are encrypted according to at least one of: a block cypher, a stream cypher, a cypher operative with a symmetric key or a cypher operative with an asymmetric key.

15. The method of claim 9 wherein decrypting the plurality of encrypted units is done according to at least one of: symmetric decryption method, asymmetric decryption method.

16. An apparatus for encryption of a message, the apparatus comprising:
    a message unit generator forming message units by splitting the message into a plurality of message units;
    an encryption unit generator encrypting each message unit into a corresponding encryption unit;
    a path unit generator splitting each encryption unit into a plurality of path units;

a path unit scrambler directing the plurality of path units to a plurality of route paths;
the path unit comprising at least one header and data;
the header comprising:
a first bit indicating a first path unit corresponding to the encryption unit;
a second bit indicating whether the path unit is a dummy unit;
a time to live field;
a path unit sequence number field indicating a path unit sequence number;
a hop index field indicating a hop index; and
a path index field indicating a path index;
wherein the first bit and/or the second bit are encrypted.

17. The encryption apparatus of claim 16, wherein the header optionally having a field indicating number of route paths.

18. The encryption apparatus of claim 16 where said path unit scrambler uses a unique network connection for each route path.

19. The encryption apparatus of claim 18 where each said unique network connection is a separate TCP connection.

20. The encryption apparatus of claim 16 where at least one of: said message unit, said encryption unit, or said path unit contains a sequence number.

21. The encryption apparatus of claim 16 where said path unit sequence number is either an integer or a pseudo-random sequence.

22. The encryption apparatus of claim 16, wherein size of the message unit is optionally determined based on the size of the path unit in order to keep the number of path units per the message unit fixed.

23. The encryption apparatus of claim 16, wherein the plurality of path units are optionally grouped and transmitted after encapsulation into a layer 2 packet, the size of which determined by a link layer protocol, when the capacity of the associated route path is high.

24. The encryption apparatus of claim 23, wherein the plurality of path units of same said route paths are grouped.

25. The encryption apparatus of claim 16, wherein the path unit scrambler is configured to direct the plurality of path units to a plurality of route paths using a routing table.

26. The encryption apparatus of claim 16 where said encryption units are encrypted according to at least one of: a block cypher, a stream cypher, a cypher operative with a symmetric key or a cypher operative with an asymmetric key.

27. An apparatus for encryption of a message, the apparatus comprising:
a message unit generator forming message units by splitting the message into a plurality of message units;
an encryption unit generator encrypting each message unit into a corresponding encryption unit;
a path unit generator splitting each encryption unit into a plurality of path units;
a path unit scrambler directing the plurality of path units to a plurality of route paths;
the path unit comprising at least one header and data;
the header comprising:
a first bit indicating a first path unit corresponding to the encryption unit;
a second bit indicating whether the path unit is a dummy unit;
a time to live field;
a path unit sequence number field indicating a path unit sequence number;
a hop index field indicating a hop index; and
a path index field indicating a path index;
wherein the time to live is updated for each hop.

28. An apparatus for encryption of a message, the apparatus comprising:
a message unit generator forming message units by splitting the message into a plurality of message units;
an encryption unit generator encrypting each message unit into a corresponding encryption unit;
a path unit generator splitting each encryption unit into a plurality of path units;
a path unit scrambler directing the plurality of path units to a plurality of route paths;
said sequence number is either an integer or a pseudo-random sequence;
wherein if route path is a wireless link having an associated range and interference value, the length of said path unit is determined based on at least one of: range of the link and interference of the link.

29. An apparatus for encryption of a message, the apparatus comprising:
a message unit generator forming message units by splitting the message into a plurality of message units;
an encryption unit generator encrypting each message unit into a corresponding encryption unit;
a path unit generator splitting each encryption unit into a plurality of path units;
a path unit scrambler directing the plurality of path units to a plurality of route paths;
wherein the path unit scrambler is configured to direct the path unit to a next node, said next node being determined based on an entry in a routing table corresponding to a destination node in the network using the routing method, said routing method comprising:
if the hop index is greater than a hop index threshold and/or the time to live is less than a time to live threshold, then determining the next node is based on a first entry in the routing table;
if the hop index is less than the hop index threshold and/or the time to live is greater than the time to live threshold then determining the next node is based on an entry in the routing table, wherein determining the entry in the routing table comprising:
identifying one or more entries corresponding to the destination node in the routing table;
determining the entry from the one or more entries corresponding to the destination node in the routing table for each odd hop index is computed by an equation:

the entry=(number of paths per node)−(path unit sequence number)mod(number of route paths);

determining the entry from the one or more entries corresponding to the destination node in the routing table for each even hop index is computed by an equation:

the entry=(path unit sequence number)mod(number of route paths).

30. An apparatus for decryption of a message, the apparatus operative to receive a plurality of path units over a plurality of route paths, each path unit comprising a header and data, the header further comprising:
a first bit indicating a first path unit corresponding to an encryption unit;
a second bit indicating that the associated path unit is a dummy unit;
a sequence number;

the apparatus comprising:
- a path unit descrambler forming encrypted units from said path units using said accompanying sequence number, the path unit descrambler discarding path units where the second bit indicates a path unit is a dummy unit, the path unit descrambler also ordering data associated with a path unit where the first bit is set to a first position;
- a message unit generator forming message units by decrypting encrypted units from the path unit descrambler;

a message generator forming a message by concatenation of message units.

31. The decryption apparatus of claim 30 where said route paths are separate network connections.

32. The decryption apparatus of claim 31 where said separate connections are separate TCP connections.

33. The decryption apparatus of claim 30 where at least one of: said message units, said encryption units, or said path units contains a sequence number used for concatenating said message units into a message.

34. The decryption apparatus of claim 33 where said sequence number is either an integer or a pseudo-random sequence.

35. The decryption apparatus of claim 30 where said encryption units are encrypted according to at least one of: a block cypher, a stream cypher, a cypher operative with a symmetric key or a cypher operative with an asymmetric key.

* * * * *